(12) United States Patent
Cornett, Jr. et al.

(10) Patent No.: US 7,512,102 B2
(45) Date of Patent: Mar. 31, 2009

(54) TECHNIQUES FOR SETTING UP TRAFFIC CHANNELS IN A COMMUNICATIONS SYSTEM

(75) Inventors: John B. Cornett, Jr., Melbourne Beach, FL (US); Kevin P. Johnson, Palm Bay, FL (US); George Rodney Nelson, Jr., Merritt Island, FL (US)

(73) Assignee: IPR Licensing, Inc., Wilmington, DE (US)

( * ) Notice: Subject to any disclaimer, the term of this patent is extended or adjusted under 35 U.S.C. 154(b) by 1245 days.

(21) Appl. No.: 10/350,308

(22) Filed: Jan. 22, 2003
(Under 37 CFR 1.47)

(65) Prior Publication Data
US 2003/0189916 A1 Oct. 9, 2003

Related U.S. Application Data

(60) Provisional application No. 60/350,835, filed on Jan. 22, 2002.

(51) Int. Cl.
*H04B 7/212* (2006.01)

(52) U.S. Cl. .................................. 370/337; 370/347

(58) Field of Classification Search ............... 370/326, 370/294, 336
See application file for complete search history.

(56) References Cited

U.S. PATENT DOCUMENTS

| 6,563,808 | B1 | 5/2003 | Cox et al. |
| 2003/0012174 | A1* | 1/2003 | Bender et al. ............... 370/347 |
| 2003/0060224 | A1 | 3/2003 | Nelson, Jr. et al. |

* cited by examiner

*Primary Examiner*—Chi H. Pham
*Assistant Examiner*—Soon D. Hyun
(74) *Attorney, Agent, or Firm*—Volpe and Koenig, P.C.

(57) ABSTRACT

A control channel supporting traffic control in epochs is divided into two control subchannels each being less than or equal to about a half epoch in duration and occurring serially in time. Slot allocation data may be transmitted and received independently over the subchannels. One subchannel may be used for transmitting forward slot allocation data and the other subchannel may be used for transmitting reverse slot allocation data. The channel split into two subchannels may be a paging channel. The forward and reverse slot allocation data may be transmitted between a base station processor and field unit. Forward and reverse traffic data may be staggered by at least about half an epoch. Transmission of traffic data happens within about two epochs after the assignments.

28 Claims, 4 Drawing Sheets

TECHNIQUES FOR SETTING UP TRAFFIC CHANNELS IN A COMMUNICATIONS SYSTEM

RELATED APPLICATION(S)

This application claims the benefit of U.S. Provisional Application No. 60/350,835, filed Jan. 22, 2002, the entire teachings of which are incorporated herein by reference.

BACKGROUND OF THE INVENTION

In a wireless telecommunications system, radio channels provide a physical link between communications units. The equipment in such a system typically includes a base station processor in communication with a network such as the Public Switched Telephone Network (PSTN), in the case of voice communications, or a data network, in the case of data communications, and one or more access terminals in communication with a plurality of end user computing devices, such as user PCs. The combination of an access terminal and computing device(s) may be referred to as a field unit. The wireless channels include forward channels, for message transmission from the base station processor to the subscriber access units, and reverse channels, for message transmission to the base station processor from the field units.

In the case of a wireless data system such as may be used to provide wireless Internet access, each base station processor typically serves many access terminals, which in turn serve many end user computing devices. The wireless channels, however, are a limited resource, and are therefore allocated by a scheduler among the field units served by the base station processor. The scheduler allocates the wireless channels among the field units on a traffic demand basis.

One way of supporting on-demand access among multiple users is referred to as Time Division Multiple Access (TDMA), where each of the wireless channels are allocated to specific connections only for certain predetermined time intervals or time slots. A second way of supporting on-demand access among multiple users is referred to as Code Division Multiple Access (CDMA), which allows multiple users to share the same radio spectrum. Instead of dividing a Radio Frequency (RF) spectrum into narrow channels (e.g. 30 kHz each in analog wireless systems), CDMA spreads many channels over a broad spectrum (1.25 MHZ in the case of the North American CDMA standard known as IS-95). To separate a particular channel from the other channel using the same spectrum at the same time, a unique digital code called a pseudo-random (i.e., pseudo-noise or PN) code is assigned to each user. Many users (up to 64 for IS-95) share the same spectrum, each using their unique code, and decoders separate the codes at each end in a process similar to a tuner that separates different frequencies in more conventional systems.

The PN codes used for communication channel definitions typically have a defined code repeat period or code epoch. For each such epoch duration (also called a slot), a base station central controlling system or processor can further schedule assignments of forward traffic channels (forward slot allocations or "FSAs") and reverse traffic channels (reverse slot allocations or "RSAs") to active mobile units for each epoch. This is typically done in such a way that all channels are assigned to active users as much as possible. It typically takes a predetermined amount of time for the allocation command to be received and to configure the demodulators before receiving the new code channel. In particular, when a PN code is reassigned to a different user connection, it typically takes a determined period of time for the code demodulators in the receiver to lock in the new code. This in turn introduces latency in the reception of the data packets that must travel on the coded channel.

To coordinate traffic channels, the base station processor communicates with a given field unit in the following manner. First, the base station processor checks to make sure there is an available channel. Second, the base station processor sends a message to the given field unit to set up the available channel. The given field unit processes the message (2-3 epochs) to set-up the channel and sends an acknowledgment (1-2 epochs) confirming set-up complete. To tear down the channel, the base station processor sends a message to the given field unit, which processes the command (1-2 epochs) and sends back an acknowledgment (1-2 epochs).

SUMMARY OF THE INVENTION

A communications system employing the principles of the present invention reduces packet latency, which, in turn, improves response time for setting up traffic channels in a communications system, such as an on-demand access, packet switched, CDMA communications system. These improvements apply to both forward and reverse traffic channels.

Channel code assignments are pipelined from a base transceiver station (BTS) down to all of the mobile units in a cell zone associated with the BTS so the actual transmission of traffic data can begin, within about two epochs after the channel assignments. Keeping this delay to a minimum is what improves the latency.

There are at least three features that help in keeping this delay short: (i) dividing a control channel, such as the paging channel, into control subchannels, such as two control subchannels or half-channels (optionally referred to as a forward half-channel and reverse half-channel), where, in the case of two control subchannels, the new split paging channels may be less than or equal to about half the duration of the standard control channels (e.g., half an epoch), (ii) staggering the forward and reverse traffic channels by about half an epoch, and eliminating the acknowledgment returned to the BTS, since the slot allocation/deallocation commands are redundant (i.e., sent multiple times for a contiguous slot allocation). Forward and reverse slot allocation data may be transmitted in objects less than or equal to about a half epoch duration and transmitted from the base station processor to the field units in respective forward and reverse subchannels, e.g., paging subchannels.

These two features can improve latency by one or two epochs per forward and reverse channel allocation. This, in turn, shows up as a noticeable improvement in response time to the user.

In one embodiment, the present invention may be used in link layer software on the base station and field units to improve channel latency and can be used by any system using a CDMA packet switched communications system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

A description of preferred embodiments of the invention follows.

Figure 1:
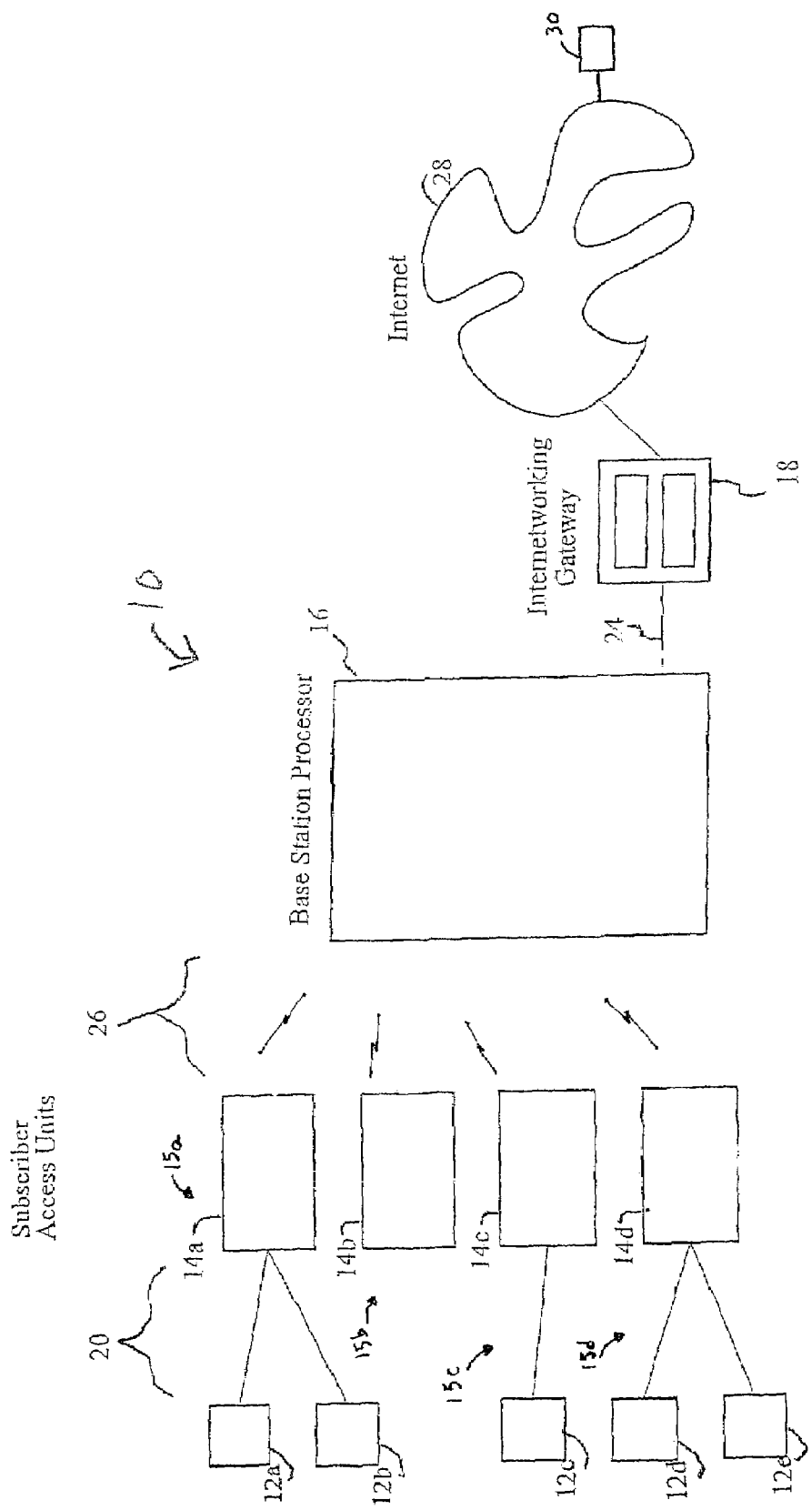
FIG. 1 is a block diagram of a wireless communications system suitable for performing wireless paging channel techniques described herein.

FIG. 1 shows a wireless telecommunications system suitable for reducing packet latency according to the principles of the present invention. A plurality of data processing devices, such a personal computers (PCs), Personal Digital Assistants (PDAs), data enabled mobile phones or the like (collectively the PCs) 12*a*-12*e* are in communication with a subset of access terminals (ATs) 14*a*-*d* via a wired connection 20. The wired connection 20 typically conforms to a wired protocol such as Ethernet with embedded TCP/IP or UDP/IP packets. The combination of a PC 12 and AT 14 may be referred to as a field unit 15 or remote unit. In the case of the second field unit 15*b*, the PC associated with the AT 14*b* is built into the AT 14*b* and is therefore not shown.

The field units 15*a*-15*d* are in wireless communication with a base station processor (BSP) 16 via a wireless link 26. The wireless link 26 conforms to a wireless protocol such as IS-95 or another wireless protocol which supports communications via an RF medium.

The base station processor 16 is also connected to a public access network 18, such as the Internet, via an internetworking gateway 24. The internetworking gateway 24 is typically a bridge, router, or other connection to a network backbone and may be provided by a remote provider, such as an Internet Service Provider (ISP). In this manner, an end user at the PC 12 is provided a wireless connection to a public access network 18 via the AT 14 and the base station processor 16.

Typically, a user PC 12 sends a message over a wired link 20, such as a local area network or bus connection, to the field unit 15. The field unit 15 sends a message via the wireless link 26 to the base station processor 16. The base station processor 16 sends the message to the public access network 28 via the internetworking gateway 18 for delivery to a remote node 30 located on the network 28. Similarly, the remote node 30 located on the network can send a message to the field unit 15 by sending it to the base station processor 16 via the internetworking gateway 24. The base station processor 16 sends the message to the access terminal 14 serving the PC 12 via the wireless link 26. The access terminal 14 sends the message to the PC 12 via the wired link 20. The PC 12 and the base station processor 16 can therefore be viewed as endpoints of the wireless link 26.

As indicated above, there are typically many more field units 15 than there are available wireless channel resources. For this reason, the wireless channels are allocated according to some type of demand-based multiple access technique to make maximum use of the available radio channels. Multiple access is often provided in the physical layer or by techniques that manipulate the radio frequency signal, such as Time Division Multiple Access (TDMA) or Code Division Multiple Access (CDMA) techniques. In any event, the nature of the radio spectrum is such that it is a medium that is expected to be shared. This is quite dissimilar from the traditional wired environment for data transmission in which a wired medium, such as a telephone line or network cabling, is relatively inexpensive to obtain and to keep open all the time.

In a typical wireless transmission, a send message often results in a return acknowledgment message. A wireless channel is allocated to send the message, and a second wireless channel is allocated in the opposite direction to send the return message. Wireless channel allocation can occur by a variety of methods well known in the art.

Figure 2:
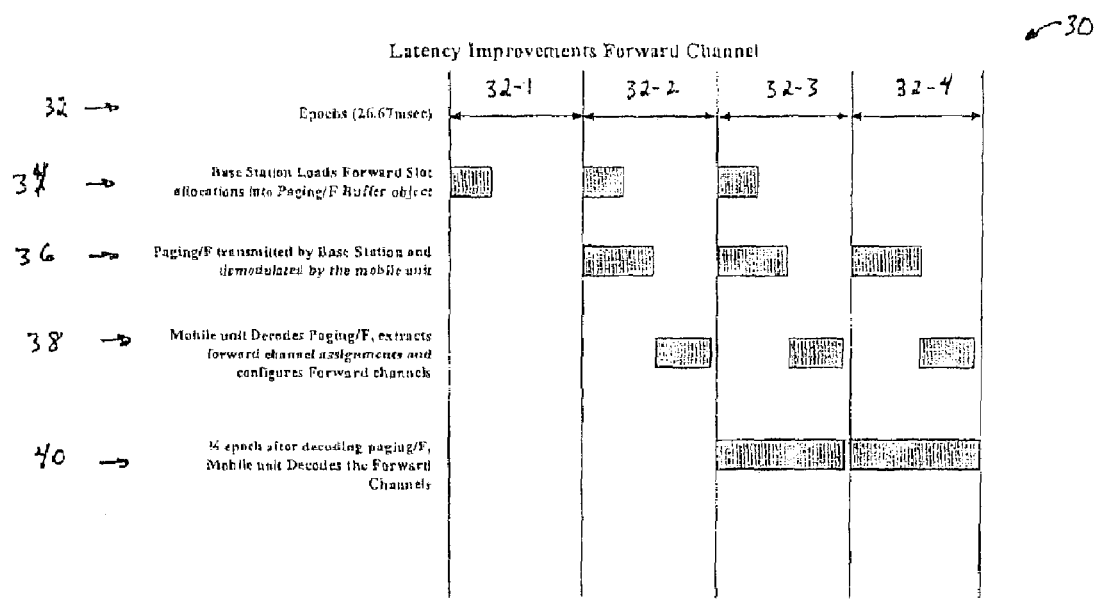
FIG. 2 is a timing diagram of a technique for allocating a forward channel according to the principles of the present invention used in the system of FIG. 1.

FIG. 2 is a timing diagram 30 indicating latency improvements (i.e., reductions) for allocating the forward channels of the wireless system 10. This improvement is described for a packet switched CDMA communications system but may be used to reduce latency in TDMA or other multiplexing systems that have forward slot allocations. In the present CDMA case, the forward link—from base station processor 16 to field units 15—includes a paging channel, multiple traffic channels, and maintenance channels. The timing diagram 30 includes relative timing of signals in the paging and traffic channels.

The timing diagram 30 is separated horizontally into four epochs 32-1 through 32-4 and vertically into a sequence of steps used to transmit and activate the forward channels. A first step 34 is provided in which the base station processor 16 loads forward slot allocations into a paging/F buffer object. The paging/F buffer object includes typical overhead information as a standard buffer object of the prior art, but only includes traffic channel allocation data for the forward traffic channels and, thus, is only a half epoch in duration. A second step 36 is provided in which the paging/F buffer object is transmitted by the base station processor 16 to the field unit 15 and demodulated by the field unit 15. In a third step 38, the field unit 15 decodes the paging/F buffer object, extracts forward channel assignments, and configures its receiver(s) for the forward channels. In a fourth step 40, a half epoch after decoding the paging/F buffer object, the field unit 15 decodes data traffic on the forward channels.

The paging channel may be split into two subchannels, such as one for transmitting forward slot allocation data and one for transmitting reverse slot allocation data. Each subchannel may be less than or equal to about half an epoch long and may be referred to as a "forward" half-channel and a "reverse" half-channel.

It should be understood that the paging channel may be further subdivided into smaller slotted subchannels of less than or equal to about $1/n^{th}$ of an epoch long, where n is the number of subchannels. Further, the lengths of the subchannels may be different, so long as the combined length is less than or equal to an epoch. It should also be understood that the subdivided channel may be a channel other than the paging channel, such as a maintenance channel or an unused traffic channel.

The rest of the discussion assumes the paging channel is split into two subchannels, referred to as half-channels.

As shown in FIG. 2, step 36, the forward paging/F object loaded in the first epoch 32-1 is transmitted over the first half-channel in the first half epoch of epoch 32-2 and also demodulated in the same first half of the epoch 32-2. The second half of the epoch 32-2 is used by the field unit 15 to decode the slot allocation data, sent in the form of messages or control data, and to configure the forward traffic channels. This means the forward channel assignments can be placed into the forward half-channel one epoch (e.g., epoch 32-2) and the forward traffic can then be placed into the very next epoch (e.g., epoch 32-3). This saves a whole extra epoch in time that would normally be needed to demodulate a standard, full paging channel, buffer object, which would, for example, fill the entire epoch 32-2 and not be ready for forward traffic data until two epochs later, epoch 32-4.

Figure 3:
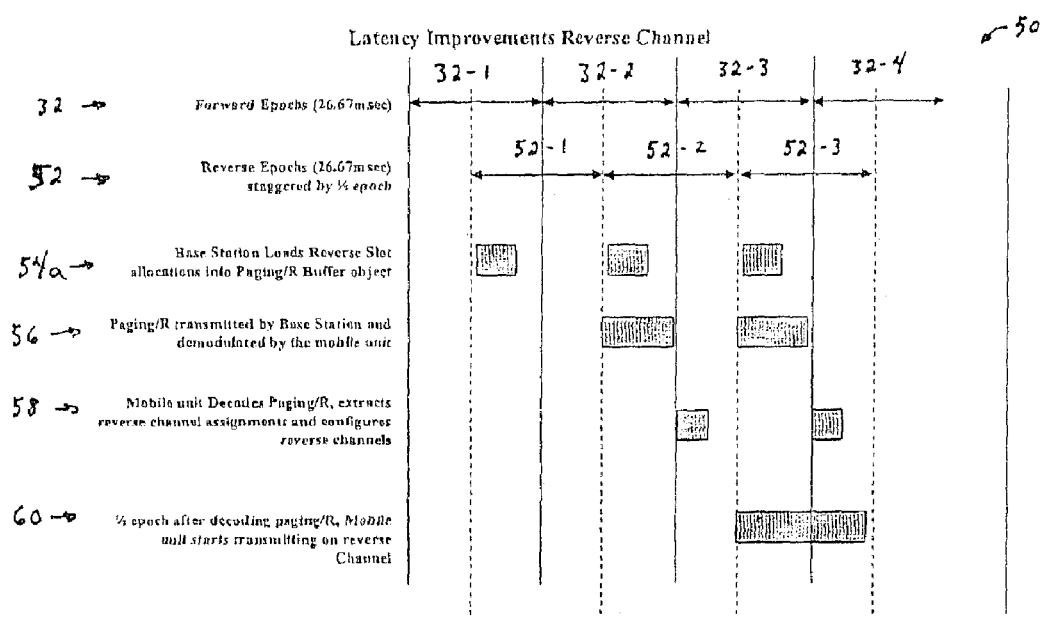
FIG. 3 is a timing diagram of a technique for allocating a reverse channel according to the principles of the present invention used in the system of FIG. 1.

FIG. 3 is a timing diagram 50 indicating latency improvements (i.e., reductions) for allocating the reverse channels of the wireless system 10. The forward epochs 32 and a corresponding set of reverse epochs 52 are provided to show timing relationships between the forward and reverse directions. The process defined in FIG. 3 includes reverse paging/R steps 54a-60 that parallel the forward paging/F steps 34-40 provided in FIG. 2.

Referring to FIG. 3, as discussed above, the paging channel is split into two half-channels. The first half-channel may be used for transmitting the ½ size paging/F object (as discussed above), and the second half-channel may be used for transmitting a ½ size paging/R object. For reverse traffic, the ½ size paging/R objects contains overhead data of standard objects, as in the case of the ½ size paging/F objects, and, similarly, the ½ size paging/R objects also include the Reverse Slot Allocation (RSA) data that can be sent and demodulated in the second half-epoch of the second epoch 32-2. Compare step 36 with step 56 to see the timing relationship of the forward and reverse half-channels.

The reverse epoch 52 may be staggered by half an epoch to close up the amount of delay between sending Reverse Slot Allocations (step 56) and actually transmitting reverse traffic (step 60). This means the reverse channel assignment can be transmitted in the reverse half-channel in one epoch 52-2 and, in the following epoch 52-3, reverse traffic data can be sent up the reverse channel defined by the reverse slot allocation data.

Splitting the paging channel into two channels of half-epoch duration and independently transmitting the paging/F and paging/R objects saves an extra epoch in time that would normally be needed to demodulate a full, standard, paging channel having the paging/F and paging/R objects concatenated and transmitted together in a full epoch. Also, by making the paging/R object only ½ epoch, the base station processor 16 can delay loading the Reverse Slot Allocations by half an epoch (e.g., start the loading at the start of the first reverse epoch 52-1 rather than at the start of the first forward epoch 32-1), which allows late requests get into the allocations that normally would need to wait another epoch.

Figure 4:
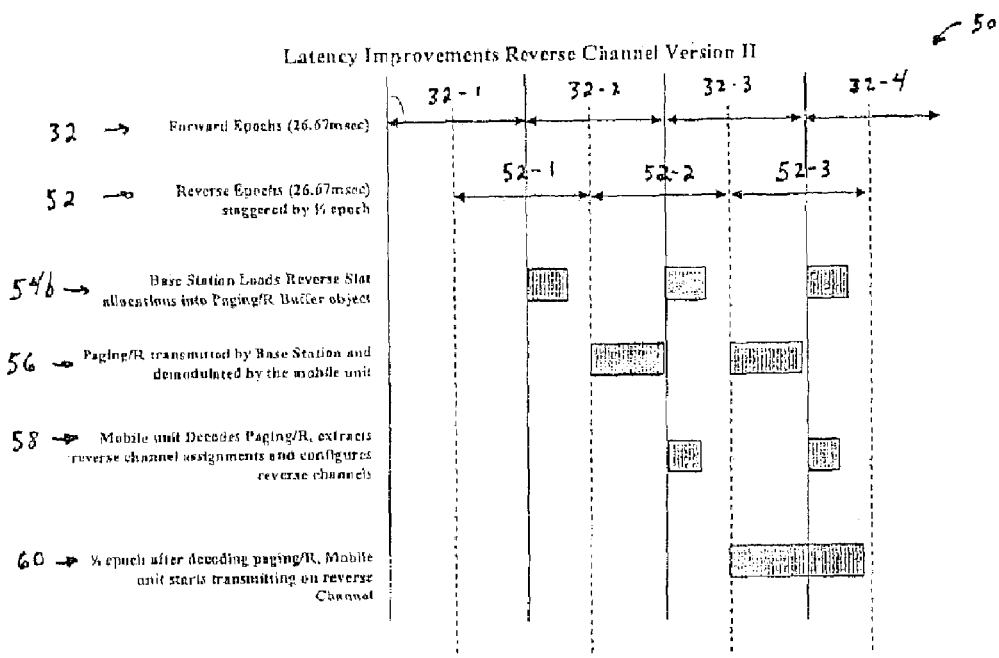
FIG. 4 is a timing diagram of an alternative technique for allocating the reverse channel according to the principles of the present invention used in the system of FIG. 1.

This system can be improved even further if the base station processor 16 delays the loading of the Reverse Slot Allocations 54a until after the first forward epoch 32-1, as defined by a loading step 54b in the timing diagram 50 of FIG. 4.

It is assumed that the Slot allocations arrive at the physical layer and are sent between the base station processor 16 and field unit 15 in one epoch. This results in another one-half epoch improvement on latency overall.

It should be understood that the process described herein may be provided by software, firmware, or hardware. The software may be stored in RAM, ROM, optical or magnetic disk, or other storage media. The software is loaded and executable by a processor that interacts with devices capable of providing wire or wireless communication functions described herein or known to operate in the system 10 of FIG. 1. The software may be distributed by physical or wireless distribution methods commonly used in commerce.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for traffic channel set-up comprising:
   dividing a control channel into a first control subchannel of less than or equal to about a half epoch in duration and a second control subchannel of less than or equal to about a half epoch in duration in the same control channel, the first and second control subchannels occurring serially in time; and
   transmitting slot allocation data in the first and second control subchannels to allocate respective time division multiplying (TDM) slots wherein the slot allocation data in the first control subchannel is independent of the slot allocation data in the second control subchannel.

2. A method according to claim 1 wherein the control channel is a paging channel.

3. A method according to claim 1 wherein transmitting slot allocation data includes transmitting forward slot allocation data in the first control subchannel and transmitting reverse slot allocation data in the second control subchannel.

4. A method according to claim 3 wherein transmitting the slot allocation data includes separating the forward and reverse slot allocation data into amounts allowing for processing of the data within about the next epoch, respectively, after reception.

5. A method according to claim 3 further including staggering transmission of a reverse traffic channel defined by the reverse slot allocation data from transmission of a forward traffic channel defined by the forward slot allocation data.

6. The method according to claim 5 wherein staggering is at least about one-half epoch.

7. The method according to claim 3 further including collecting reverse channel allocation requests during transmission of slot allocation data over the first subchannel.

8. An apparatus for traffic channel set-up comprising:
   a processor to divide a control channel into a first control subchannel of less than or equal to about a half epoch in duration and a control second subchannel of less than or equal to about a half epoch in duration in the same control channel, the first and second control subchannels occurring serially in time; and
   a transmitter coupled to the processor to transmit independent slot allocation data in the first and second control subchannels to allocate respective time division multiplying (TDM) slots.

9. The apparatus according to claim 8 wherein the control channel is a paging channel.

10. The apparatus according to claim 8 wherein the transmitter transmits forward slot allocation data in the first control subchannel and reverse slot allocation data in the second control subchannel.

11. The apparatus according to claim 10 wherein the processor separates the forward and reverse slot allocation data into amounts allowing for processing of the data within about the next epoch, respectively, after reception.

12. The apparatus according to claim 10 wherein the transmitter staggers transmission of a reverse traffic channel defined by the reverse slot allocation data from the transmission of a forward traffic channel defined by the forward slot allocation data.

13. The apparatus according to claim 12 wherein the staggering is at least about one-half epoch.

14. The apparatus according to claim 10 wherein the processor collects reverse channel allocation requests during the transmission of slot allocation data over the first control subchannel.

15. A method for traffic channel set-up comprising:
dividing a control channel into a first control subchannel of less than or equal to about a half epoch in duration and a second control subchannel of less than or equal to about a half epoch in duration, the first and second control subchannels occurring serially in time; and
receiving slot allocation data in the first and second control subchannels to allocate respective time division multiplying (TDM) slots wherein the slot allocation data in the first control subchannel is independent of the slot allocation data in the second control subchannel.

16. A method according to claim 15 wherein the control channel is a paging channel.

17. A method according to claim 15 wherein receiving slot allocation data includes receiving forward slot allocation data in the first control subchannel and reverse slot allocation data in the second control subchannel.

18. A method according to claim 17 further including processing the forward and reverse slot allocation data within about the next epoch, respectively, after reception.

19. A method according to claim 17 further including receiving a reverse traffic channel defined by the reverse slot allocation data staggered from receiving a forward traffic channel defined by the forward slot allocation data.

20. The method according to claim 19 wherein the forward and reverse traffic is staggered at least about one-half epoch.

21. The method according to claim 19 wherein receiving includes receiving the reverse slot allocation data corresponding to reverse channel requests sent during receiving the first control subchannel.

22. An apparatus for traffic channel set-up comprising:
a processor to divide a control channel into a first control subchannel of less than or equal to about a half epoch in duration and a second control subchannel of less than or equal to about a half epoch in duration, the first and second subchannels occurring serially in time; and
a receiver to receive slot allocation data in the first and second subchannels to allocate respective time division multiplying (TDM) slots wherein the slot allocation data in the first control subchannel is independent of the slot allocation data in the second control subchannel.

23. The apparatus according to claim 22 wherein the control channel is a paging channel.

24. The apparatus according to claim 22 wherein the receiver receives forward slot allocation data in the first control subchannel and reverse slot allocation data in the second control subchannel.

25. The apparatus according to claim 24 wherein the processor processes the forward and reverse slot allocation data within about the next epoch, respectively, after reception.

26. The apparatus according to claim 24 wherein the receiver receives a reverse traffic channel defined by the reverse slot allocation data staggered from a forward traffic channel defined by the forward slot allocation data.

27. The apparatus according to claim 26 wherein the staggering is at least about one-half epoch.

28. The apparatus according to claim 24 wherein the receiver receives the reverse channel allocation data corresponding to reverse channel requests sent during receiving the first control subchannel.

* * * * *

UNITED STATES PATENT AND TRADEMARK OFFICE
CERTIFICATE OF CORRECTION

PATENT NO. : 7,512,102 B2
APPLICATION NO. : 10/350308
DATED : March 31, 2009
INVENTOR(S) : Cornett, Jr. et al.

It is certified that error appears in the above-identified patent and that said Letters Patent is hereby corrected as shown below:

At column 1, line 45, before the words "in the" delete "MHZ" and insert therefor --MHz--.

At column 3, line 22, before the word "personal" delete "a" and insert therefor --as--.

At column 4, line 30, before the words "as a" insert --such--.

At column 5, line 44, after the word "requests" insert --to--.

Signed and Sealed this

Thirtieth Day of June, 2009

JOHN DOLL
*Acting Director of the United States Patent and Trademark Office*